(12) United States Patent
Ozawa

(10) Patent No.: US 9,763,133 B2
(45) Date of Patent: Sep. 12, 2017

(54) CONTENT DELIVERY SYSTEM AND CONTENT DELIVERY METHOD

(75) Inventor: Kazunori Ozawa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 245 days.

(21) Appl. No.: 14/130,850

(22) PCT Filed: Jul. 4, 2012

(86) PCT No.: PCT/JP2012/067049
§ 371 (c)(1),
(2), (4) Date: Jan. 3, 2014

(87) PCT Pub. No.: WO2013/005758
PCT Pub. Date: Jan. 10, 2013

(65) Prior Publication Data
US 2014/0146669 A1   May 29, 2014

(30) Foreign Application Priority Data

Jul. 5, 2011   (JP) ................................ 2011-149192

(51) Int. Cl.
*H04L 12/26*   (2006.01)
*H04W 28/02*   (2009.01)
(Continued)

(52) U.S. Cl.
CPC ........ *H04W 28/0273* (2013.01); *G06F 13/00* (2013.01); *G06F 17/30132* (2013.01);
(Continued)

(58) Field of Classification Search
None
See application file for complete search history.

(56) References Cited

U.S. PATENT DOCUMENTS 6,874,017 B1   3/2005   Inoue et al.
7,130,268 B2   10/2006   Mascolo
(Continued)

FOREIGN PATENT DOCUMENTS

JP   2000-276425   10/2000
JP   2004-516693   6/2004
(Continued)

OTHER PUBLICATIONS

European Search Report—EP 12 80 7124—Feb. 16, 2015.
(Continued)

*Primary Examiner* — Kwang B Yao
*Assistant Examiner* — Hardikkumar Patel
(74) *Attorney, Agent, or Firm* — Sughrue Mion, PLLC

(57) ABSTRACT

A plurality of cache servers, connected to a packet forwarding apparatus, forwarding a packet transmitted and received between a storage apparatus that holds a content under management in store and a user terminal, temporarily holds at least part of the content under management in store. A controller decides an on-screen resolution at the terminal, based on information contained in a content request message from the terminal, and selects a cache server that holds a content of the on-screen resolution in store. The controller instructs the selected cache server to deliver the content. The cache server instructed calculates a bit rate based on a signal received from the terminal. The cache server reads content from the terminal, which is to have the on-screen resolution and a bit rate not higher than the calculated bit rate. The content is stored in a packet and transmitted, then delivered without reducing the user's QoE.

10 Claims, 5 Drawing Sheets

(51) Int. Cl.

| | | |
|---|---|---|
| *G06F 13/00* | (2006.01) | |
| *G06F 17/30* | (2006.01) | |
| *H04N 21/231* | (2011.01) | |
| *H04N 21/472* | (2011.01) | |
| *H04L 12/801* | (2013.01) | |
| *H04L 12/841* | (2013.01) | |
| *H04N 21/2343* | (2011.01) | |
| *H04N 21/238* | (2011.01) | |
| *H04L 12/825* | (2013.01) | |

(52) U.S. Cl.
CPC ........ *H04L 43/0894* (2013.01); *H04L 47/193* (2013.01); *H04L 47/263* (2013.01); *H04L 47/266* (2013.01); *H04L 47/283* (2013.01); *H04N 21/231* (2013.01); *H04N 21/238* (2013.01); *H04N 21/23103* (2013.01); *H04N 21/23106* (2013.01); *H04N 21/234363* (2013.01); *H04N 21/47202* (2013.01); *H04L 43/0864* (2013.01); *Y02B 60/31* (2013.01)

(56) References Cited

U.S. PATENT DOCUMENTS

| | | |
|---|---|---|
| 7,747,255 B2 | 6/2010 | Dacosta et al. |
| 2001/0044835 A1 | 11/2001 | Schober et al. |
| 2001/0044857 A1 | 11/2001 | Pham et al. |
| 2002/0085587 A1* | 7/2002 | Mascolo ............ H04L 43/0882 370/477 |
| 2003/0110293 A1 | 6/2003 | Friedman et al. |
| 2004/0042432 A1* | 3/2004 | Riazi .................... H04W 88/16 370/338 |
| 2005/0041584 A1* | 2/2005 | Lau ..................... H04L 41/0866 370/235 |
| 2009/0254657 A1* | 10/2009 | Melnyk ................. H04L 47/10 709/224 |
| 2010/0195517 A1* | 8/2010 | Kihara ................ H04L 43/0864 370/252 |
| 2011/0022685 A1* | 1/2011 | Walker .................. H04N 7/163 709/219 |
| 2012/0210381 A1 | 8/2012 | Ozawa |

FOREIGN PATENT DOCUMENTS

| | | |
|---|---|---|
| JP | 2004-518218 | 6/2004 |
| JP | 2005-522098 | 7/2005 |
| JP | 2008533811 | 8/2008 |
| JP | 2009026170 | 2/2009 |
| JP | 2010-097291 | 4/2010 |
| JP | 2010-273298 | 12/2010 |
| WO | 02/33889 | 4/2002 |
| WO | WO 2011-049179 | 4/2011 |

OTHER PUBLICATIONS

Japanese Office Action, dated Dec. 2, 2014, in corresponding Japanese Patent Application No. 2013-523028, with partial English translation.

International Search Report, PCT/JP2012/067049, Sep. 25, 2012.

* cited by examiner

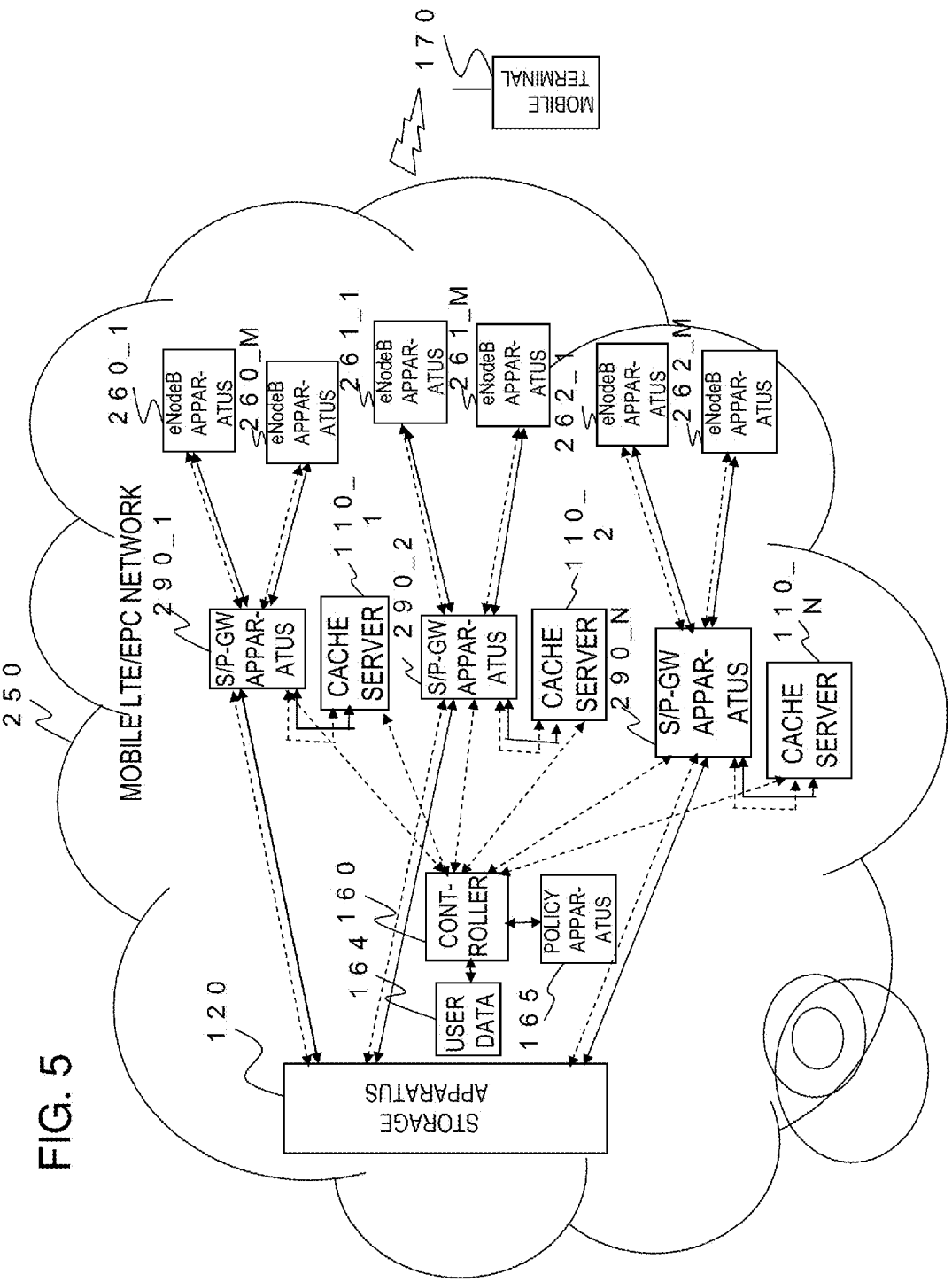

CONTENT DELIVERY SYSTEM AND CONTENT DELIVERY METHOD

REFERENCE TO RELATED APPLICATION

This application is based upon and claims the benefit of the priority of Japanese Patent Application No. 2011-149192 filed on Jul. 5, 2011, the disclosure of which is incorporated herein in its entirety by reference thereto.

FIELD

This invention relates to a content delivery system and a content delivery method. More particularly, it relates to such content delivery system and method in which the content inclusive of moving pictures, still pictures, audio, software, applications and so forth are cached on a mobile network so as to be then delivered to a variety of terminals, such as mobile handsets, smartphones, PCs (Personal Computers) or game machines.

BACKGROUND

As the speed of transmission over the mobile network as well as the capacity of the mobile network is increasing, content delivery of providing the content over the mobile network to a variety of terminals, inclusive of mobile terminals, is becoming increasingly proliferated. It may be anticipated that the speed of transmission over and the capacity of the mobile network will increase further in time to come by techniques such as LTE (Long Term Evolution) or EPC (Evolved Packet Core).

Patent Literature 1 shows an information transmission system in which the information representing the on-screen resolution at a terminal is acquired and in which picture image data is transformed to match to the terminal on-screen resolution acquired to transmit the resulting picture image data to the terminal. Patent Literature 2, on the other hand, shows a content delivery system in which the picture image size is dynamically changed to meet data transmission speed requirements of a client as a request source.

PTL 1

JP Patent Kokai Publication No. JP2010-097291A

PTL 2

JP Patent Kohyo Publication No. JP2004-518218A

SUMMARY

The disclosures of the aforementioned Patent Literatures are incorporated herein by reference thereto. The following analysis is made by the present invention.

It may be anticipated that, towards and even beyond the year 2013, the volume of the traffic of a data system, delivered over the mobile network, will increase by a factor of 8 to 10 or more, and that the picture content accounts for a major portion of the entire traffic volume. On the other hand, with an improved terminal capacity attendant on rapid coming into widespread use of smartphones, the size of the picture content is estimated to be increasing. In near future, the content of large capacity by high-vision resolution is predicted to be circulated on the mobile network.

It is noted that, in delivering contents under management, inclusive of pictures, moving pictures, audio, software or applications, over the mobile network, a diversity of terminals are used as terminals. For example, conventional mobile handsets, smartphones, tablet type terminals or PCs are used. The legacy practice has been to transmit requests for contents from the total of the terminals by a packet forwarding apparatus to a storage apparatus that holds a large number of contents under management in store. In turn, the storage apparatus delivers the contents by the packet forwarding apparatus to the total of the terminals.

However, in this configuration, the following problems are presented.

First of all, there is presented a problem that, despite the fact that the on-screen resolution at the terminal differs from one terminal to another, content delivery may not be made with an optimum on-screen resolution correlated to the difference in the on-screen resolution.

There is another problem that, even though the bandwidth of the mobile network is subject to variations with time, it is not possible to deliver the content such as to follow such bandwidth variations without remodeling the terminal. If accesses from the terminals are concentrated to a sole frequently accessed popular content under management, the traffic on the mobile network is concentrated to the storage apparatus that holds the content under management in store. In this case, the load on the network is locally rapidly increased, thus eventually leading to congestion on the mobile network. If once such congestion should take place, delays or packet losses may be produced, or the picture may become frozen on the terminal side. In addition, the picture may be degraded in quality or the voice interrupted, thus deteriorating the QoE (Quality of Experience). The problem is severer with increase in the number of the terminals or in the content capacity.

Desirably, these problems should be settled without remodeling the terminal.

It is true that, with the techniques disclosed in the Patent Literatures 1 and 2, picture image data may be changed from one terminal to another. It is however not possible to deliver the content in meeting with variations in the mobile network bandwidths.

Therefore, there is a need in the art to deliver the content without reducing the user QoE.

According to a first aspect of the present invention, there is provided a content delivery system. The content delivery system comprises, on a mobile network: a plurality of cache servers connected to at least one of a plurality of packet forwarding apparatuses configured to forward a packet(s) transmitted/received between a storage apparatus, holding a content(s) under management in store, and a user terminal; the plurality of cache servers temporarily holding at least part of the content(s) under management in store; and a controller that controls at least one of the plurality of cache servers. The controller decides an on-screen resolution at the terminal, based on information contained in a content request message from the terminal, and selects, out of the plurality of cache servers, a cache server holding in store a content of the on-screen resolution decided, and instructs the selected cache server to deliver the content. The plurality of cache servers comprise: a bit rate calculation unit that, based on a signal received from the terminal, calculates a bit rate with which a content is sent out; and a transmission unit that reads out a file or a stream of a content requested from the terminal, the file or the stream read out having the on-screen resolution and a bit rate not higher than the calculated bit rate, stores the file or the stream in a packet of a predetermined protocol, and outputs the packet.

According to a second aspect of the present invention, there is provided a content delivery method. The content delivery method comprises: by a plurality of cache servers, connected to at least one of a plurality of packet forwarding apparatuses configured to forward a packet(s) transmitted/received between a storage apparatus holding a content(s) under management in store and a user terminal, temporarily holding at least part of the content(s) under management in store; by a controller, deciding an on-screen resolution at the terminal based on information contained in a content request message from the terminal; by the controller, selecting, out of the plurality of cache servers, a cache server that holds in store a content of the on-screen resolution decided, and instructing the selected cache server to deliver the content; by a cache server, out of the plurality of cache servers, instructed by the controller, calculating a bit rate with which a content is sent out, based on a signal received from the terminal; and by the cache server instructed, reading out a file or a stream of a content requested from the terminal and having the on-screen resolution and a bit rate not higher than the calculated bit rate, storing the file or the stream in a packet of a predetermined protocol, and outputting the packet.

The present invention provides the following advantage, but not restricted thereto. With the content delivery system according to the present invention, it is possible to deliver the content without reducing the user QoE.

BRIEF DESCRIPTION OF DRAWINGS

FIG. 5 is a block diagram showing an example configuration of a content delivery system according to a second exemplary embodiment.

PREFERRED MODES

Figure 1:
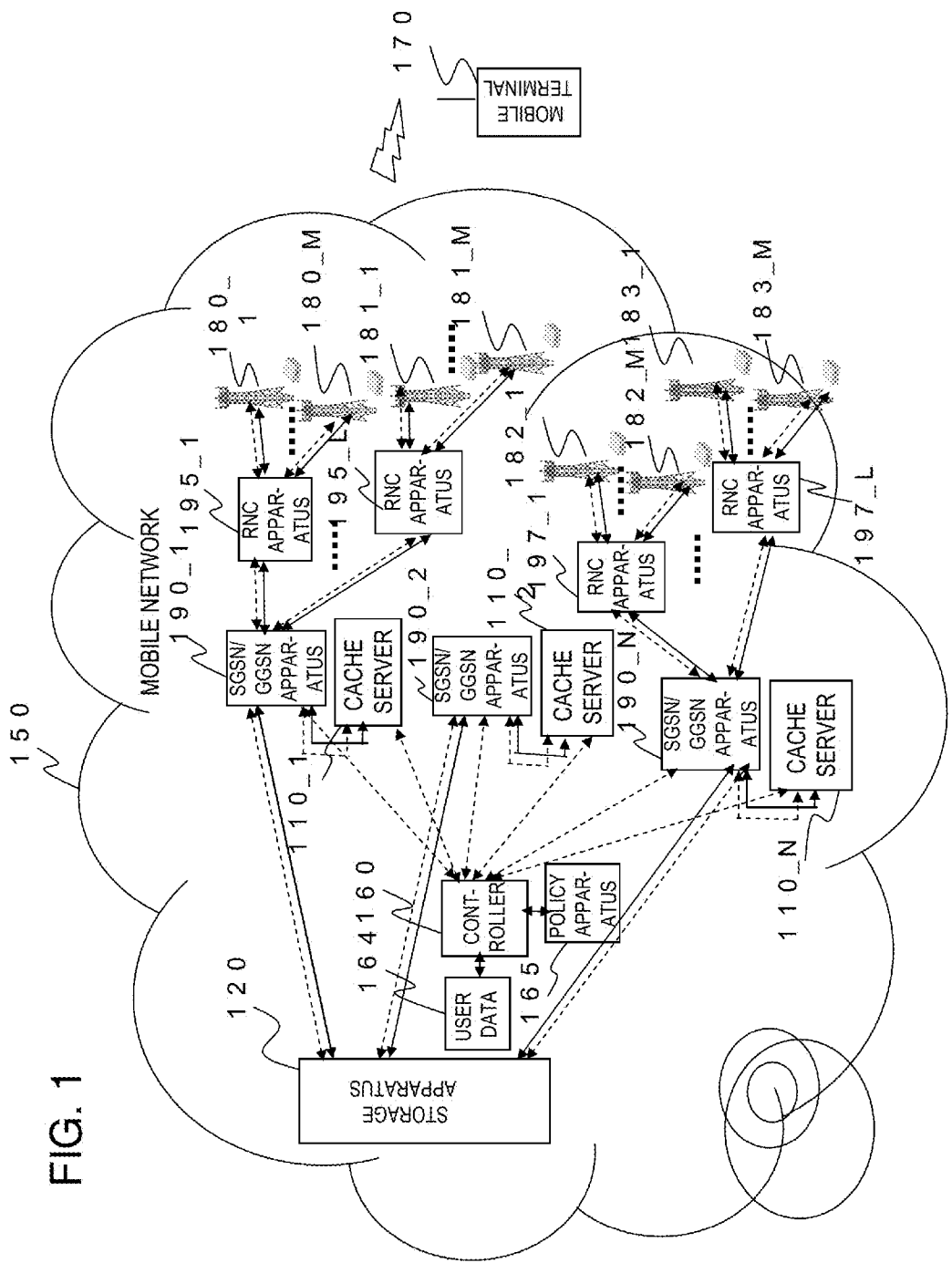
FIG. 1 is a block diagram showing an example connection configuration of a content delivery system according to a first exemplary embodiment.

In the present disclosure, there are various possible modes, which include the following, but not restricted thereto. Initially, the gist of the present invention will be briefly explained by way of a synopsis. It is noted that reference symbols used in the synopsis are merely illustrations to assist in the understanding and are not intended to restrict the invention to the particular mode shown in the drawings.

Figure 3:
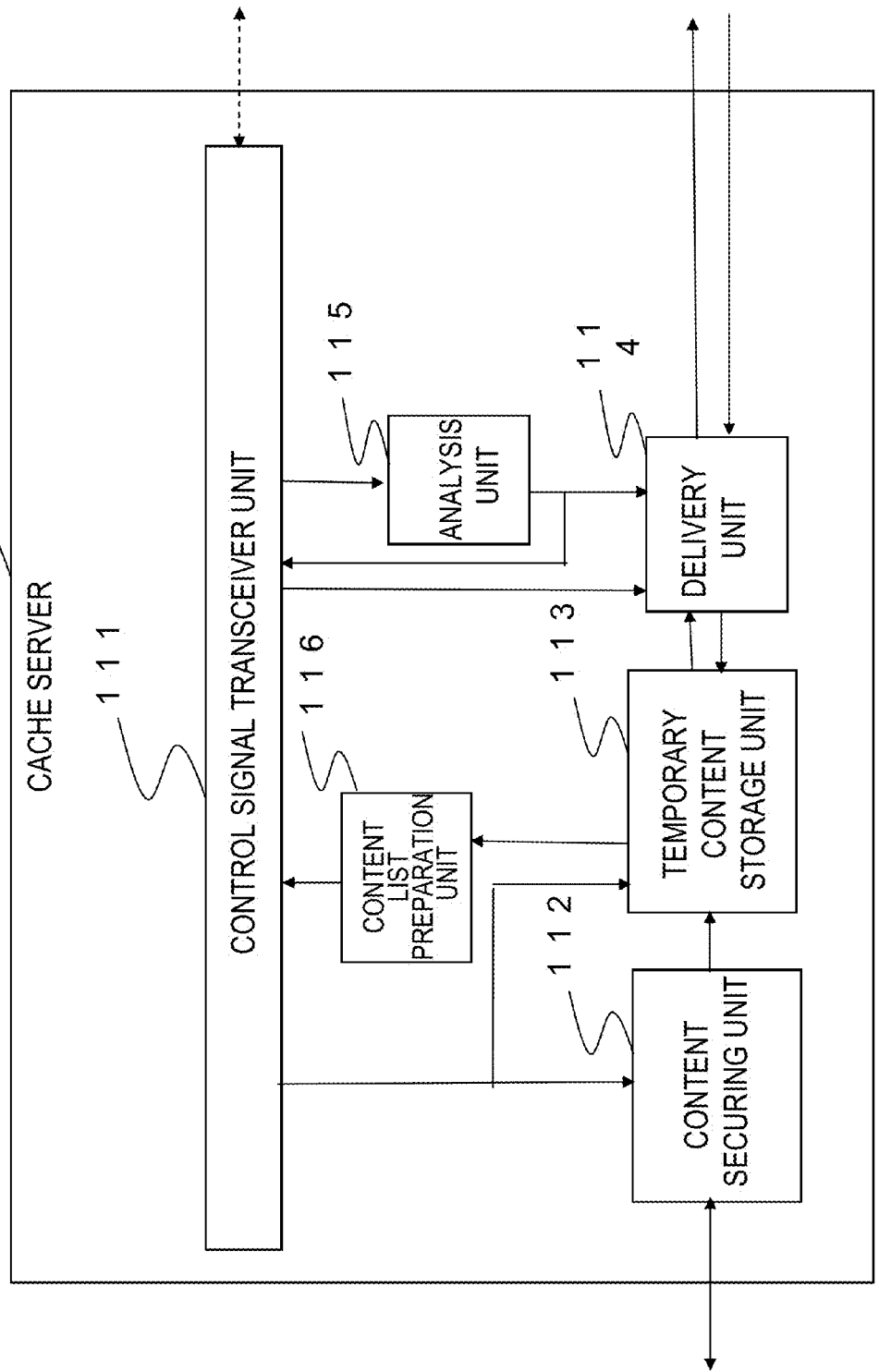
FIG. 3 is a block diagram showing an example configuration of a cache server in the content delivery system according to the first exemplary embodiment.
Figure 4:
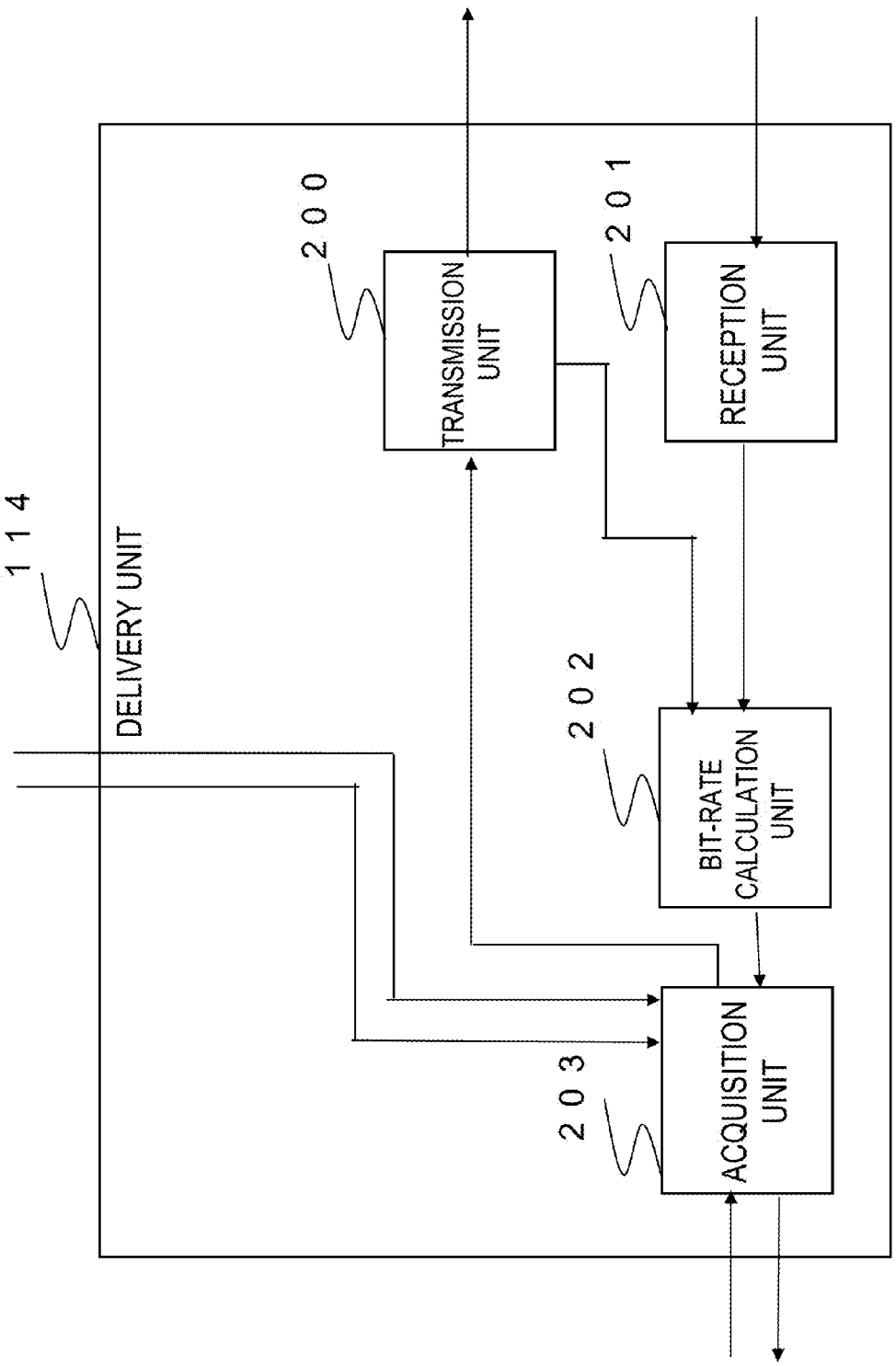
FIG. 4 is a block diagram showing an example connection configuration of a delivery unit of the content delivery system according to the first exemplary embodiment.

Referring to FIG. 1, FIG. 3 and FIG. 4, a content delivery system according to the present invention comprises, on a mobile network (150), a storage apparatus (120) that holds a content(s) under management in store, and a plurality of packet forwarding apparatuses (such as SGSN/GGSN apparatuses 190_1 to 190_N) configured to forward a packet(s) transmitted/received between the storage apparatus (120) and a user terminal (such as mobile handset 170). The content delivery system also includes a plurality of cache servers (110_1 to 110_N) that temporarily hold at least part of the content(s) under management in store and a controller (160) that controls at least one of the plurality of cache servers (110_1 to 110_N). These cache servers (110_1 to 110_N) are connected to at least one of the packet forwarding apparatuses (such as SGSN/GGSN apparatuses 190_1 to 190_N). The controller (160) decides an on-screen resolution at the terminal (170) based on information contained in a content request message from the terminal (170), and selects, out of the plurality of cache servers (110_1 to 110_N), a cache server that holds in store a content of the on-screen resolution decided. The controller instructs the selected cache server to deliver the content. The plurality of cache servers (110_1 to 110_N) comprise a bit rate calculation unit (202) that, based on a signal received from the terminal (170), calculates a bit rate with which a content is sent out, and a transmission unit (200) that reads out a file or a stream of a content requested from the terminal (170). The file or the stream read out is to have the above mentioned on-screen resolution and a bit rate not higher than the calculated bit rate. The transmission unit stores the file or stream in a packet of a predetermined protocol and outputs the packet.

The bit rate calculation unit (202) may calculate the above mentioned bit rate based on a TCP (Transmission Control Protocol) response signal or an ECN (Explicit Congestion Notification) signal as received from the terminal (170). The bit rate calculation unit (202) may measure a response time of a packet as a difference between a time point of transmission of a pre-set packet from the transmission unit (200) and a time point of reception from the terminal (170) of the TCP response signal for the pre-set packet, and calculate the above mentioned bit rate based on the above mentioned response time. On reception of the ECN signal from the terminal (170), the bit rate calculation unit (202) may reduce the bit rate by a predetermined amount or to zero.

The controller (160) may extract a plurality of cache servers that store the content of the above mentioned on-screen resolution, out of the plurality of cache servers (110_1 to 110_N). The controller may select one cache server, out of the plurality of the cache servers extracted, depending on coverage information (in-service-area information) for the terminal (170).

Referring to FIG. 1 and FIG. 5, the plurality of packet forwarding apparatuses are respectively SGSN (Serving General packet radio service Support Node) apparatuses, GGSN (Gateway General packet radio service Support Node) apparatuses, SGSN/GGSN apparatuses, in a mobile network (150), S-GW (Serving Gateway) apparatuses, P-GW (Packet data network Gateway) apparatuses or S/P-GW apparatuses in a mobile LTE/EPC network (250).

The following modes are possible with the present invention:
(Mode 1)
A content delivery system, comprising, on a mobile network:
a storage apparatus that holds a content(s) under management in store;
a plurality of packet forwarding apparatuses that forward a packet(s) transmitted/received between the storage apparatus and a user terminal;
a plurality of cache servers that temporarily hold at least part of the content(s) under management in store; and
a controller that controls at least one of the plurality of cache servers, wherein
the plurality of cache servers are connected to at least one of the plurality of packet forwarding apparatuses,
the controller decides an on-screen resolution at the terminal based on information contained in a content request message from the terminal, and selects, out of the plurality of cache servers, a cache server that holds a content of the decided on-screen resolution in store, and instructs the selected cache server to deliver the content, and the plurality of cache servers comprise:

a bit rate calculation unit that, based on a signal received from the terminal, calculates a bit rate with which a content is sent out; and a transmission unit that reads out a file or a stream of a content as requested from the terminal, the file or the stream read out having the on-screen resolution and a bit rate not higher than the calculated bit rate, stores the file or stream in a packet of a predetermined protocol, and outputs the packet.

(Mode 2)

The bit rate calculation unit may calculate the bit rate based on a TCP response signal or an ECN (Explicit Congestion Notification) signal received from the terminal.

(Mode 3)

The bit rate calculation unit may measure a response time of a packet as a difference between a time point of transmission of a pre-set packet from the transmission unit and a time point of reception from the terminal of the TCP response signal for the pre-set packet, and calculate the bit rate based on the response time.

(Mode 4)

On reception of the ECN signal from the terminal, the bit rate calculation unit may reduce the bit rate a predetermined amount or to zero.

(Mode 5)

The controller may extract a plurality of cache servers that store the content of the on-screen resolution, out of the plurality of cache servers, and select a cache server, out of the plurality of cache servers extracted, depending on coverage (or in-service area) information for the terminal.

(Mode 6)

The plurality of packet forwarding apparatuses may respectively be SGSN apparatuses, GGSN apparatuses, SGSN/GGSN apparatuses, in the mobile network, S-GW apparatuses, P-GW apparatuses or S/P-GW apparatuses in a mobile LTE/EPC network.

(Mode 7)

The content under management may include at least one of a moving picture, a still picture, voice, audio, software, application and data.

(Mode 8)

A content delivery method, comprising:

by a storage apparatus, holding a content(s) under management in store;

by a plurality of cache servers, connected to at least one of a plurality of packet forwarding apparatuses configured to forward a packet(s) transmitted/received between the storage apparatus and a user terminal, temporarily holding at least part of the content(s) under management in store;

by a controller, deciding an on-screen resolution at the terminal based on information contained in a content request message from the terminal;

by the controller, selecting, out of the plurality of cache servers, a cache servers holding a content of the decided on-screen resolution in store, and instructing the selected cache server to deliver the content; by a cache server, out of the plurality of cache servers, instructed by the controller, calculating a bit rate with which a content is sent out, based on a signal received from the terminal; and by the cache server instructed, reading out a file or a stream of a content requested from the terminal and having the on-screen resolution and a bit rate not higher than the calculated bit rate, storing the file or the stream in a packet of a predetermined protocol, and outputting the packet.

(Mode 9)

In the content delivery method, the cache server instructed may calculate the bit rate based on a TCP response signal or an ECN (Explicit Congestion Notification) signal received from the terminal.

(Mode 10)

In the content delivery method, the cache server instructed may calculate a response time of a packet as a difference between a time point of transmission of a pre-set packet from the transmission unit and a time point of reception from the terminal of the TCP response signal for the pre-set packet, and calculate the bit rate based on the response time.

(Mode 11)

In the content delivery method, on reception of the ECN signal from the terminal, the cache server instructed may reduce the bit rate a predetermined amount or to zero.

(Mode 12)

In the content delivery method, the controller may extract a plurality of cache servers that store a content of the on-screen resolution, out of the plurality of cache servers, and select a cache server, out of the plurality of cache servers extracted, depending on coverage information for the terminal.

First Exemplary Embodiment

A configuration as well as an operation of a content delivery system according to a first exemplary embodiment will now be explained with reference to FIG. 1 through to FIG. 4.

The following exemplary embodiment shows a case in which the content is a moving picture, as an example. However, the same configuration may be used for the case in which the content is a still picture, audio, voice, software, application or data.

FIG. 1 depicts a block diagram showing an example configuration of a content delivery system of the present exemplary embodiment, in which a mobile network is a 3G (3rd Generation) mobile network and a packet forwarding apparatus is an SGSN/GGSN apparatus.

Referring to the block diagram of FIG. 1, there is stored in a storage apparatus 120 the content(s) owned by a mobile operator or the content(s) for which the mobile operator has entered into a delivery contract with a content provider. In the present description, these content(s) are termed the content(s) under management. Here, the content(s) under management is assumed to be a compressed/encoded bit stream of the content(s) or a file containing such compressed/encoded bit stream. The content(s) may include at least one out of moving pictures, still pictures, audio and speech and the like. It is noted that the content(s) under management may also be software, applications or data. Although the terminal used here is a mobile terminal, any suitable terminal other than the mobile terminal may be used.

An N-number (N≥2) of SGSN/GGSN apparatuses 190_1 to 190_N is arranged on a mobile network 150. The SGSN/GGSN apparatus 190_1 is connected to RNC (Radio Network Controller) apparatuses 195_1 to 195_L, and the SGSN/GGSN apparatus 190_N is similarly connected to RNC (Radio Network Controller) apparatuses 197_1 to 197_L, where L≥2. Although an L-number of RNC apparatuses is also connected to the SGSN/GGSN apparatus 190_2, these RNC apparatuses are not shown to save the drawing space. In addition, an M-number of base stations, where M≥2, is connected to each RNC apparatus. For example, an M-number of base stations 180_1 to 180_M is connected to the RNC apparatus 195_1.

In FIG. 1, one or more cache server(s) is connected to a GGSN function section of each SGSN/GGSN apparatus. For example, a cache server 110_1 is connected to the SGSN/GGSN apparatus 190_1. It is noted that the SGSN/GGSN apparatus denotes such an apparatus in which a SGSN function section and a GGSN function section are installed in one and the same location.

An N-number of cache servers 110_1 to 110_N is connected to a single controller 160. It is noted that not the total but a part of the N-number of the cache servers 110_1 to 110_N may also be connected to the controller 160.

A mobile terminal 170 sends a delivery connection request message, stating a URL (Uniform Resource Locator) of the content it requests. Such base station whose service area covers the mobile terminal 170 (one of base stations 181_1 to 181_M in the case of FIG. 1) receives the delivery connection request message. This base station sends the connection request message to the RNC apparatus that supervises the base station. In the case of FIG. 1, such RNC apparatus is the RNC apparatus 195_L.

On reception of the connection request message from the base station, the RNC apparatus 195_L saves the message, an IP (Internet Protocol) address of the storage apparatus 120 and an IP address of the mobile terminal 170 in a payload portion of a GTP (General packet radio service Tunneling Protocol) packet. The RNC apparatus then forwards the GTP packet to the SGSN/GGSN apparatus 190_1 to which the RNC apparatuses 195_1 to 195_L are arrayed.

The SGSN/GGSN apparatus 190_1 then receives the GTP packet.

The cache server 110_1 is connected to a Gi interface of the GGSN function section of the SGSN/GGSN apparatus 190_1. In similar manner, the cache server 110_N is connected to a Gi interface of the GGSN function section of the SGSN/GGSN apparatus 190_N.

To the controller 160, there are connected the cache servers 110_1 to 110_N and a policy apparatus 165. The controller 160 finds out the on-screen resolution at the mobile terminal 170 from the connection request information from the mobile terminal 170 and selects the cache server holding the content of the on-screen resolution of interest to send an instruction to the so selected cache server.

On reception of the instruction from the controller 160, each cache server reads out the content requested, having the on-screen resolution as instructed, and delivers the so read-out content to the mobile terminal 170. Each cache server also detects temporal variations of the bandwidth of a radio domain of the mobile network to carry out content delivery such as to follow such variations.

Figure 2:
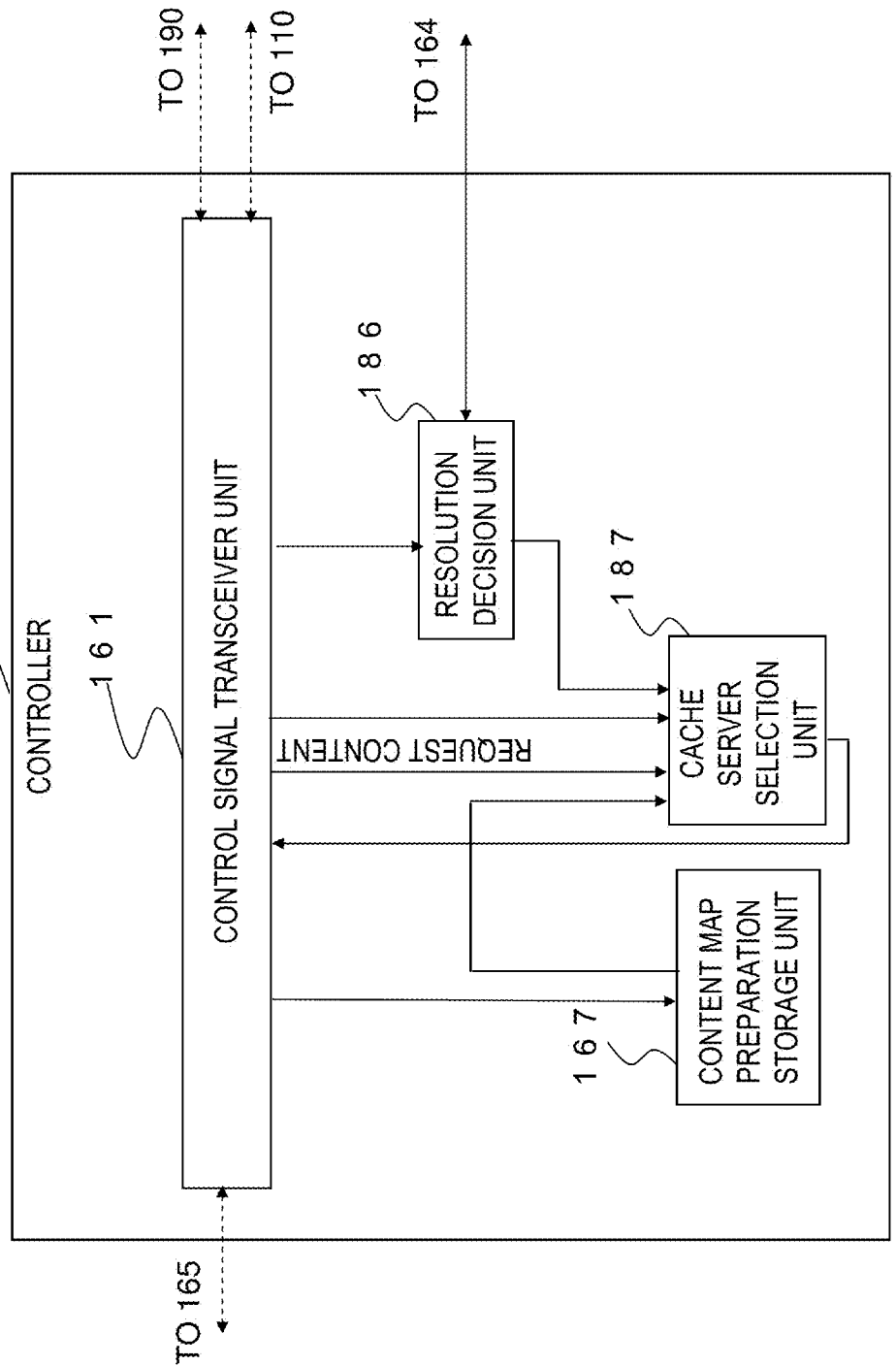
FIG. 2 is a block diagram showing an example configuration of a controller in the content delivery system according to the first exemplary embodiment.

FIG. 2 depicts a block diagram showing an example configuration of the controller 160. Referring to FIG. 2, the configuration of the controller 160 will be explained. In FIG. 2, the controller 160 includes a control signal transceiver unit 161, a resolution decision unit 186, a cache server selection unit 187 and a content map preparation storage unit 167.

The control signal transceiver unit 161 extracts the terminal information contained in a user agent section of the connection request information from the mobile terminal 170 to output the so extracted terminal information to the resolution decision unit 186. The control signal transceiver unit 161 also outputs the request content information to the cache server selection unit 187. The control signal transceiver unit 161 also outputs the coverage information for the mobile terminal 170 to the cache server selection unit 187.

The resolution decision unit 186 inputs the terminal information, and finds out the relationship between the terminal information and the on-screen resolution from user data 164 in which user data are registered from the outset. The resolution decision unit finds out the on-screen resolution information associated with the mobile terminal of interest to output the on-screen resolution information to the cache server selection unit 187.

The cache server selection unit 187 inputs the coverage information for the mobile terminal 170 and the information concerning the requested content, such as its URL, from the control signal transceiver unit 161. The cache server selection unit also inputs the information concerning the on-screen resolution information at the mobile terminal from the resolution decision unit 186, while inputting a content map from the content map preparation storage unit 167. It is noted that the content map is such a map indicating which content is being cached by each cache server. The cache server selection unit 187 selects a group of cache servers caching the content requested by the mobile terminal 170 and having the resolution which is the same as that delivered from the resolution decision unit 186. The cache server selection unit 187 selects one cache servers as the coverage information or the like is taken into account. The cache server selection unit then instructs the so selected cache server to deliver the content as requested by the terminal via the control signal transceiver unit 161.

At a predetermined time interval, the content map preparation storage unit 167 receives a content list from each of the cache servers 110_1 to 110_N, via the control signal transceiver unit 161, to prepare a content map indicating which content is temporarily cached by which cache server. The so prepared content map is then stored.

In FIG. 3, an example configuration of the cache server 110_1 is shown by a block diagram. Here, the configuration of the cache server 110_1, connected to the SGSN/GGSN apparatus 190_1, will be explained with reference to FIG. 3. Note that the other cache servers 110_2 to 110_N are the same in configuration as the cache server 110_1, and hence only the configuration of the cache server 110_1 will be explained.

Referring to FIG. 3, the cache server 110_1 includes a control signal transceiver unit 111, an analysis unit 115, a content securing unit 112, a temporary content storage unit 113, a content list preparation unit 116 and a delivery unit 114.

Referring to FIG. 3, the control signal transceiver unit 111 receives a GTP packet from the SGSN/GGSN apparatus 190_1 coordinated to the cache server selected by the cache server selection unit 187 shown in FIG. 2. In the GTP packet, there are stored, above all, a connection request message from the mobile terminal 170, a reception IP address of the mobile terminal 170 and the URL of the content requested. The control signal transceiver unit 111 also receives the coverage or in-service-area information for the mobile terminal 170 from the SGSN/GGSN apparatus 190_1.

The analysis unit 115 reads out the connection request message stored in the payload portion of the GTP packet and extracts the information inclusive of the reception IP address of the mobile terminal 170 and the URL of the requested content. The analysis unit sends these information items to the controller 160 via the control signal transceiver unit 111. The analysis unit 115 also sends out the information of the coverage information for the mobile terminal 170 to the controller 160. The analysis unit 115 also outputs the URL or the like of the requested content to the delivery unit 114.

The content securing unit 112 reads out the specified content from the storage apparatus 120 in advance and outputs the so read-out content to the temporary content storage unit 113.

The temporary content storage unit 113 saves the content.

For the total of the contents, the cache server of interest is holding in store in its temporary content storage unit 113, the content list preparation unit 116 prepares a content list at a predetermined time interval or whenever a predetermined condition is met. The content list preparation unit outputs a content list of the cache server of interest to the controller 160 via the control signal transceiver unit 111.

The delivery unit 114 inputs the URL information of the requested content from the analysis unit 115. The delivery unit inputs the on-screen resolution at the mobile terminal 170 from the cache server selection unit 187 of FIG. 2 and searches the temporary content storage unit 113 for the requested content having the on-screen resolution of interest. The delivery unit then reads out the relevant content. For the so read out content, the delivery unit 114 generates a packet of a defined protocol, such as TCP protocol, to send out the packet to the SGSN/GGSN apparatus 190_1, which SGSN/GGSN apparatus 190_1 delivers the packet, containing the content, to the mobile terminal 170.

FIG. 4 depicts a block diagram showing an example configuration of the delivery unit 114. Referring to FIG. 4, the configuration and the operation of the delivery unit 114 will be explained. In FIG. 4, the delivery unit 114 includes a transmission unit 200, a reception unit 201, a bit-rate calculation unit 202 and an acquisition unit 203. In the course of the content delivery, the delivery unit 114 calculates the bit rate, and accordingly switches to a file or a stream of an adequate bit rate to deliver the content.

The reception unit 201 receives a response signal packet, such as an Ack signal, from the mobile terminal 170, via the SGSN/GGSN apparatus 190_1, and outputs the information of the response signal packet to the bit-rate calculation unit 202. By way of an alternate configuration, if the reception unit 201 has received from the mobile terminal 170 an ECN (Explicit Congestion Notification) signal testifying to a congested state, the reception unit may instruct the bit-rate calculation unit 202 to rapidly decrease the bit rate.

The bit-rate calculation unit 202 inputs the information on a transmission packet and the information on the response packet and, with the use of a packet number, correlates the transmission packet and the response packet to each other to calculate a response time T in accordance with the following equation (1):

$$T = T\text{ack} - T\text{send} \quad (1)$$

In the above equation (1), Tack denotes a time point of reception of an N'th response signal packet by the reception unit 201 and Tsend a time point of transmission of an N'th transmission packet from the transmission unit 200.

The bit-rate calculation unit 202 sets a target time Ta in advance and calculates difference delay time between T and Ta. Based on this difference delay time, the bit-rate calculation unit calculates a transmission bit rate B from the following equation (2):

$$B = (1-\alpha) \times Bc + \alpha \times \beta \times (Ta-T) \quad (2)$$

In the above equation (2), Bc denotes the transmission bit rate of the transmission packet of interest the bit-rate calculation unit 202 has received from the transmission unit 200. $\alpha$ is a coefficient which determines the convergence time, and is set in advance at a suitable value, $\beta$ is a defined conversion coefficient to transform time changes into a bit rate. It is noted that the bit-rate calculation unit 202 is able to perform calculations of the equation (2) at a defined time interval or in case a corresponding request has been from the acquisition unit 203.

The bit-rate calculation unit 202 outputs the bit rate B, calculated in accordance with the equation (2), to the acquisition unit 203 at a defined time interval. It is also possible for the bit-rate calculation unit 202 to output the bit rate B responsive to a request from the acquisition unit 203.

As an alternate configuration, if the bit-rate calculation unit 202 has received an ECN signal from the reception unit 201, the bit-rate calculation unit may conclude that the mobile network is in a congested state and accordingly decrease the bit rate B by a defined value or set B=0. The setting of B=0 indicates that no packet is to be transmitted from the transmission unit 200 during a defined time domain.

The acquisition unit 203 inputs the URL of the requested content from the analysis unit 115 of FIG. 3, while inputting the on-screen resolution from the control signal transceiver unit 111 of FIG. 3 and the bit rate B from the bit-rate calculation unit 202. The acquisition unit retrieves the temporary content storage unit 113 of FIG. 3 for a file that has the specified on-screen resolution and a bit rate not exceeding and closest to the bit rate B. The acquisition unit acquires the relevant file or bit stream to output the so acquired file or stream to the transmission unit 200. It is noted that, in case the bit-rate calculation unit 202 has set B=0, the acquisition unit 203 does not get the content but outputs a signal indicating B=0 to the transmission unit 200.

From the acquisition unit 203, the transmission unit 200 inputs the file or the stream of the content requested by the mobile terminal 170 and having the on-screen resolution as specified by the controller 160. The transmission unit 200 saves the input file or stream in a TCP packet, as an example, and transmits the resulting packet to the SGSN/GGSN apparatus 190_1. The transmission unit 200 also notifies the bit-rate calculation unit 202 about the information on the packet transmitted, e.g., packet number, time point of transmission, transmission bit rate or size. Note that, if B=0 has been set, the transmission unit 200 refrains from transmitting packets for a pre-set time duration.

A diversity of modifications is possible with the present exemplary embodiment.

In FIG. 1, the controller 160 inputs, from the policy unit 165, the topology of the mobile network as well as the cost incurred on the network routing paths. However, if these information items remain unchanged during the operation or are predetermined fixed information, they may also be stored as a table on board the controller 160.

The cache servers may also be interconnected, in which case the content may be accommodated between different cache servers. For example, there may be such a case that, when the mobile terminal 170 is connected to the cache server 110_1, the content requested is not cached in this cache server 110_1. It is then possible for the cache server 110_1 to make an inquiry at the controller 160, which controller 160 then determines whether the content of interest is held by a neighboring cache server, such as cache server 110_2 or 110_N. The controller 160 may then instruct the cache server 110_1 to read out the content of interest from the cache server that holds the content of interest.

In FIG. 1, a single cache server is connected to a single SGSN/GGSN apparatus. It is however also possible to connect a single cache server to a plurality of SGSN/GGSN apparatuses or to connect a plurality of cache servers to a single SGSN/GGSN apparatus.

The storage apparatus 120 may also be connected to the cache servers 110_1 to 110_N.

In FIG. 1, the SGSN apparatus and the GGSN apparatus are unified into one as the SGSN/GGSN apparatus. However, it is also possible that the SGSN apparatus is distinct from the GGSN apparatus. In such case, at least one or more cache server(s) is connected to the SGSN apparatus or to the GGSN apparatus.

The mobile terminal 170 may be a mobile handset, a smartphone or a PC loaded with a data communication card. Or, it may also be any other terminal provided that the terminal is capable of having communication with a mobile 3G network.

The bit-rate calculation unit 202 may calculate the bit rate using an equation other than the equations (1) or (2).

In the present exemplary embodiment, the controller 160 is an apparatus physically distinct from the cache server. In an alternate configuration, the controller 160 may be loaded on an apparatus which is physically the same as the cache server, provided that the apparatus on which the controller is loaded is logically different from the cache server.

Second Exemplary Embodiment

Referring to FIG. 5, a configuration as well as an operation of a content delivery system according to a second exemplary embodiment will now be described in detail. FIG. 5 depicts a block diagram showing an example configuration of the content delivery system of the present exemplary embodiment.

In FIG. 5, the parts or components denoted by the same symbols operate in the same manner as in FIG. 1, and hence the corresponding description is dispensed with. FIG. 5 shows a configuration employing, as a mobile network 250, an LTE (Long Term Evolution)/EPC (Evolved Packet Core) network which is not the 3G mobile network but is a 3.9th generation mobile network. In LTE, the functions of the base station and the RNC apparatus are degraded such that just an eNodeB (enhanced/evolved Node B) apparatus is used.

Also, in EPC, an S/P-GW (Serving/Packet data network Gateway) apparatus is connected to the eNodeB apparatus. By the S/P-GW apparatus is meant an apparatus comprised of an S-GW apparatus and a P-GW apparatus unified together. Moreover, FIG. 5 shows a configuration in which an M-number of eNodeB apparatuses is connected to a single S/P-GW apparatus. For example, eNodeB apparatuses 260_1 to 260_N are connected to an S/P-GW apparatus 290_1.

It is noted that a single cache server is connected to each S/P-GW apparatus. As an example, the cache server 110_1 is connected to the S/P-GW apparatus 290_1.

In case the mobile terminal 170 sends a delivery connection request message, stating an IP address of the storage apparatus 120, an eNodeB apparatus whose service area covers the mobile terminal 170 receives the connection request message. Such eNodeB apparatus is one of eNodeB apparatuses 261_1 to 261_M in the case of FIG. 5. Such one of the eNodeB apparatuses 261_1 to 261_M writes the connection request message, an IP address of the storage apparatus 120, an IP address of the mobile terminal 170 and so forth, in the payload portion of the GTP protocol, and forwards the resulting GTP packet to the S/P-GW apparatus 290_2.

The cache server 110_1 is of the same configuration as that shown in FIG. 3. However, in the present exemplary embodiment, the connection destination of the control signal transceiver unit 111 is the S/P-GW apparatus 290_1. Hence, the control signal transceiver unit 111 receives the GTP packet, having saved therein the connection request message from the mobile terminal 170, its IP address and so forth, and the location information of the mobile terminal 170, from the S/P-GW apparatus 290_1. It is noted that other cache servers 110_2 to 110_N exchange the information with the S/P-GW apparatuses connected thereto in a manner similar to that described above.

A variety of modifications are possible with the present exemplary embodiment.

The controller 160 inputs the mobile network topology and the cost of the network routing path from the policy apparatus 165. If these information items remain unchanged during the operation or are predetermined fixed information, they may also be stored as a table on board the controller 160.

The cache servers may also be interconnected, in which case the content may be accommodated between different cache servers. For example, it is now assumed that, when the mobile terminal 170 connects to the cache server 110_1, the content requested has not been cached in this cache server 110_1. In such case, an inquiry may be made by the cache server 110_1 at the controller 160, which controller 160 may then instruct the cache server 110_1 to read out the content not from the storage apparatus 120 but from a neighboring cache server, such as the cache server 110_2 or 110_N.

FIG. 5 shows a case where a single cache server is connected to a single S/P-GW apparatus. It is however also possible to connect a single cache server to a plurality of S/P-GW apparatuses or to connect a plurality of cache servers to a single S/P-GW apparatus.

The storage apparatus 120 may also be connected to the cache servers 110_1 to 110_N.

In FIG. 5, the S-GW and the P-GW apparatus are unified into one as the S/P-GW apparatus. It is however also possible that the S-GW apparatus and the P-GW apparatus are distinct apparatuses. In such case, at least one or more cache server(s) may be connected to the S-GW apparatus or to the P-GW apparatus.

The mobile terminal 170 may be a mobile handset, a smartphone or a PC loaded with a data communication card. Or, it may also be any other terminal provided that the terminal is capable of having communication with a mobile 3.9G network.

The bit-rate calculation unit 202 may calculate the bit rate using an equation other than the equations (1) or (2).

In the present exemplary embodiment, the controller 160 is an apparatus physically distinct from the cache server. In an alternate configuration, the controller 160 may be loaded on an apparatus which is physically the same as the cache server, provided that the apparatus on which the controller is loaded is logically different from the cache server.

With the content delivery system according to the present invention, the following beneficial effects may be derived.

The controller finds out the on-screen resolution proper to the terminal, based on the connection request signal from the terminal, and selects the cache server that holds the content of the relevant on-screen resolution in store. The controller then sends out an instruction to the so selected cache server. It is thus possible to distribute the content of the on-screen resolution, suited to the performance or profile of the terminal, without it being necessary to remodel the terminal.

In addition, the delivery unit of the cache server calculates the bit rate, based on a response or notification from a terminal, and outputs a file or a stream of an adequate bit rate based on the results calculated. It is thus possible to avoid congestion of the mobile network even in case of access concentration to any particular content. The beneficent effect is outstanding in case of increase in the number of terminals as well as in the content capacities. From the user perspective, delay or packet losses are not incurred, while there is no such problem as picture image freezing or voice interruption on the terminal side.

The disclosures of the aforementioned Patent Literatures are incorporated by reference herein. The particular Examples may be modified or adjusted within the gamut of the entire disclosure of the present invention, inclusive of claims, based on the fundamental technical concept of the invention. Moreover, a variety of combinations or selection of elements disclosed inclusive of the elements of claims, Examples and the drawings may be made within the concept of the claims. The present invention may encompass a wide variety of modifications or corrections that may occur to those skilled in the art in accordance with the entire disclosure of the present invention, inclusive of claims and the technical concept of the invention.

REFERENCE SIGNS LIST

101_1 to 101_N cache servers
111 control signal transceiver unit
112 content securing unit
113 temporary content storage unit
114 delivery unit
115 analysis unit
116 content list preparation unit
120 storage apparatus
150 mobile network
160 controller
161 control signal transceiver unit
164 user data
165 policy apparatus
167 content map preparation storage unit
170 mobile terminal
180_1 to 180_M, 181_1 to 181_M, 182_1 to 182_M, 183_1 to 183_M base stations
186 resolution decision unit
187 cache server selection unit
190_1 to 190_N SGSN/GGSN apparatuses
195_1 to 195_L, 197_1 to 197_L RNC apparatuses
200 transmission unit
201 reception unit
202 bit-rate calculation unit
203 acquisition unit
250 mobile LTE/EPC network
260_1 to 260_M, 261_1 to 261_M, 262_1 to 262_M eNodeB apparatuses
290_1 to 290_N S/P-GW apparatuses

The invention claimed is:

1. A content delivery system, comprising, on a mobile network:
   a plurality of cache servers connected to at least one of a plurality of packet forwarding apparatuses configured to forward packets between a storage apparatus holding a content under management in store, and a user terminal; the plurality of cache servers caching at least part of the content under management in store stored in the storage apparatus; and
   a controller that controls the plurality of cache servers, the controller comprises:
      an on-screen resolution calculation unit that, based on a signal received from the user terminal requesting the content, calculates the on-screen resolution of the user terminal; and
      selects a cache server from the plurality of cache servers based on the on-screen resolution of the user terminal to transmit the content;
   wherein the selected cache server comprises:
      a bit rate calculation unit that, based on the signal received from the user terminal, calculates a bit rate with which the content is sent out based on Transmission Control Protocol (TCP) response signal received from the user terminal; and
      a transmission unit that reads out a file or a stream of the content requested from the user terminal, the file or the stream read out having a bit rate not higher than the calculated bit rate, stores the file or the stream in a packet of a predetermined protocol, and outputs the packet.

2. The content delivery system according to claim 1, wherein the bit rate calculation unit measures a response time of a packet as a difference between a time point of transmission of a pre-set packet from the transmission unit and a time point of reception from the user terminal of the TCP response signal for the pre-set packet to calculate the bit rate based on the response time.

3. The content delivery system according to claim 1, wherein the controller extracts a plurality of cache servers that store the content of the on-screen resolution, out of the plurality of cache servers, and selects a cache server out of the plurality of cache servers extracted, depending on in-service-area information for the user terminal.

4. The content delivery system according to claim 1, wherein the plurality of packet forwarding apparatuses are respectively Serving General packet radio service Support Node (SGSN) apparatuses, Gateway General packet radio service Support Node (GGSN) apparatuses or SGSN/GGSN apparatuses in the mobile network, Serving Gateway (S-GW) apparatuses, Packet data network Gateway (P-GW) apparatuses or S/P-GW apparatuses in a mobile Long Term Evolution (LTE)/Evolved Packet Core (EPC) network.

5. The content delivery system according to claim 1, wherein the content under management includes at least one of a moving picture, a still picture, voice, audio, software, application and data.

6. A content delivery method, comprising:
   by a plurality of cache servers, connected to at least one of a plurality of packet forwarding apparatuses configured to forward packets between a storage apparatus holding a content under management in store, and a user terminal, caching at least part of the content under management in store stored in the storage apparatus;
   by a controller, calculating an on-screen resolution of the user terminal, based on a signal received from the user terminal requesting the content;
   by the controller, selecting a cache server from the plurality of cache servers, based on the on-screen resolution of the user terminal to transmit the content;
   by the selected cache server, instructed by the controller, calculating a bit rate with which the content is sent out, based on the signal received from the user terminal; and
   by the selected cache server, reading out a file or a stream of the content requested from the user terminal and having a bit rate not higher than the calculated bit rate, storing the file or the stream in a packet of a predetermined protocol, and outputting the packet,
wherein the selected cache server calculates the bit rate based on a Transmission Control Protocol (TCP) response signal received from the user terminal.

7. The content delivery method according to claim 6, wherein
the cache server instructed measures a response time of a packet as a difference between a time point of transmission of a pre-set packet from the transmission unit and a time point of reception from the user terminal of the TCP response signal for the pre-set packet, and calculates the bit rate based on the response time.

8. The content delivery system according to claim 2, wherein the plurality of packet forwarding apparatuses are respectively Serving General packet radio service Support Node (SGSN) apparatuses, Gateway General packet radio service Support Node (GGSN) apparatuses or SGSN/GGSN apparatuses in the mobile network, Serving Gateway (S-GW) apparatuses, Packet data network Gateway (P-GW) apparatuses or S/P-GW apparatuses in a mobile Long Term Evolution (LTE)/Evolved Packet Core (EPC) network.

9. The content delivery system according to claim 2, wherein the content under management includes at least one of a moving picture, a still picture, voice, audio, software, application and data.

10. The content delivery system according to claim 4, wherein the content under management includes at least one of a moving picture, a still picture, voice, audio, software, application and data.

* * * * *